L. M. DODDRIDGE.
SNAP-HOOKS.
No. 195,808. Patented Oct. 2, 1877.
Fig. 1.
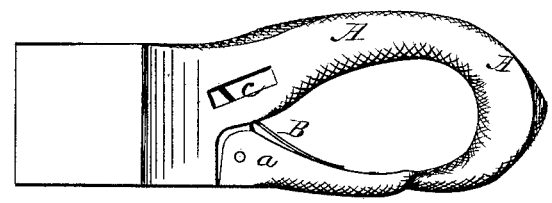
Fig. 2. Fig. 4. Fig. 3.
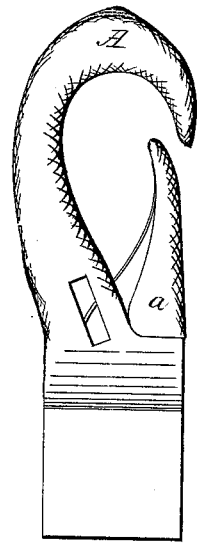  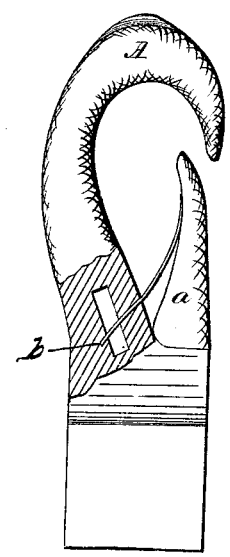
Witnesses:
Arthur W. Adams
J. Wm Mister
Inventor:
L. M. Doddridge
Edson Bros.
Attorney.

UNITED STATES PATENT OFFICE.

LOYAL M. DODDRIDGE, OF NEW MOUNT PLEASANT, INDIANA.

IMPROVEMENT IN SNAP-HOOKS.

Specification forming part of Letters Patent No. 195,808, dated October 2, 1877; application filed August 29, 1877.

*To all whom it may concern:*

Be it known that I, L. M. DODDRIDGE, of New Mount Pleasant, in the county of Jay and State of Indiana, have invented certain new and useful Improvements in Snap-Hooks; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a side view of my improved snap-hook. Fig. 2 is a similar view thereof, showing the action of its pivoted or hinged bar or tongue upon its spring when the said bar or tongue is compressed or forced inwardly. Fig. 3 is a sectional view, and Fig. 4 a front view, thereof.

Corresponding parts in the several figures are denoted by like letters.

This invention relates to a certain improvement in snap-hooks; and it consists in combining, with the pivoted or hinged tongue or bar, a spring inserted into the shank of the hook proper, through and past a slot therein, substantially as hereinafter more fully set forth.

In the annexed drawing, A refers to the hook proper, the opening to which is closed by a bar or tongue, $a$, hinged or pivoted at one end thereto, and having its other end resting or bearing upon the beak thereof. B refers to a spring, preferably of flat metal, and curved somewhat in the form of an S, but not essentially so. The inner or one end of this spring is inserted into a snug socket, $b$, in the shank of the hook proper, A, and through and past a slot or opening, $c$, made in said shank, and extending through the latter from side to side, the outer or free end of said spring resting or bearing upon the bar $a$ of the hook proper, A.

By thus socketing and passing the spring through and past the slot $c$, it will be observed that, as the spring is flexed or bowed when the pivoted bar or tongue $a$ is forced inwardly in opening the hook to release the strap or rein caught and held therein, the said slot or opening will permit the inner end of the spring to bulge (as pressure is exerted thereon) in the direction of the length of said slot, and the said bulge thus serves as a shoulder to securely retain the spring in place as the pivoted bar or tongue is being acted upon, as above stated.

Having thus described my invention, what I claim, and desire to secure by Letters Patent, is—

The hook A, having its shank provided with the lateral slot or opening $c$, in combination with the spring B, inserted into a snug socket in said shank of hook, and through and past the opening or slot $c$, substantially as and for the purpose specified.

In testimony that I claim the foregoing as my own I hereunto affix my signature in presence of two witnesses.

LOYAL M. DODDRIDGE.

Witnesses:
CHARLES REED,
JOSEPH R. OSBORN.